July 31, 1923.

L. J. JENSON

HAY SWEEP

Filed July 15, 1921

Witness
Edward T. Wray.

Inventor
Louis J. Jenson
by Parker & Carter
Attorneys

July 31, 1923.

L. J. JENSON

HAY SWEEP

Filed July 15, 1921

Witness
Edward T. Wray.

Inventor
Louis J. Jenson
By Parker & Carter
Attorneys

Patented July 31, 1923.

1,463,584

UNITED STATES PATENT OFFICE.

LOUIS J. JENSON, OF FORT COLLINS, COLORADO.

HAY SWEEP.

Application filed July 15, 1921. Serial No. 484,928.

*To all whom it may concern:*

Be it known that I, LOUIS J. JENSON, a citizen of the United States, residing at Fort Collins, in the county of Larimer and State of Colorado, have invented a certain new and useful Improvement in Hay Sweeps, of which the following is a specification.

My invention relates to hay sweep cleaners and more particularly to cleaners adapted freely to permit the collection of hay on the hay sweep, during the forward motion of the sweep, but adapted when the fork is moved rearwardly to resist rearward motion, for a predetermined interval, and thus to clean the hay from the sweep. Another object is the provision of a ground contacting shoe which is adapted to hold the hay sweep cleaner fixed during rearward motion of the fork, but which is normally during the forward movement of the hay sweep out of contact with the ground. Other objects will appear from time to time in the course of the specifications.

My invention is illustrated more or less diagrammatically in the following drawings, wherein.

Figure 1:
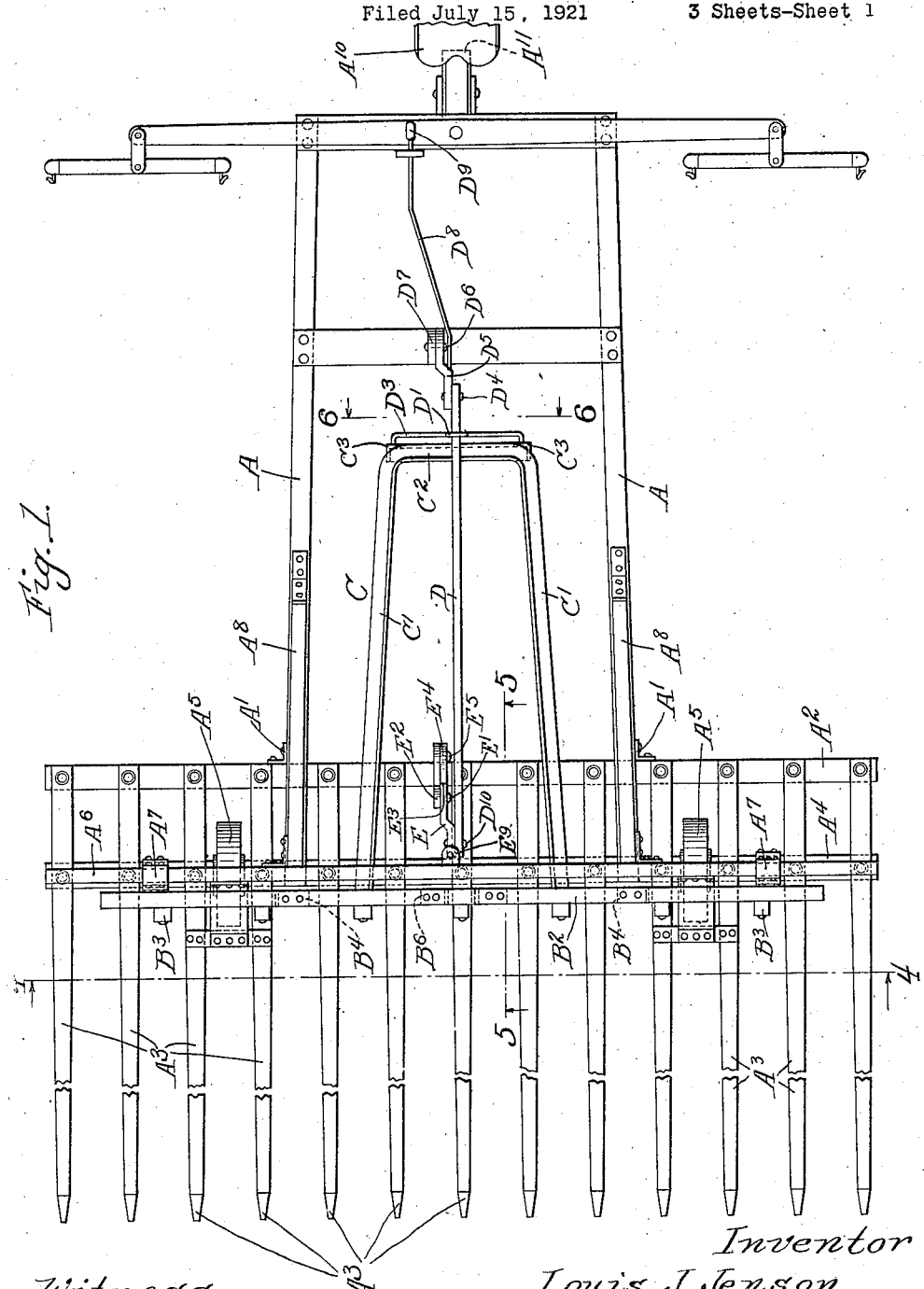
Figure 1 is a plan view of the hay sweep with the hay sweep cleaner placed at the rear thereof.
Figure 2:
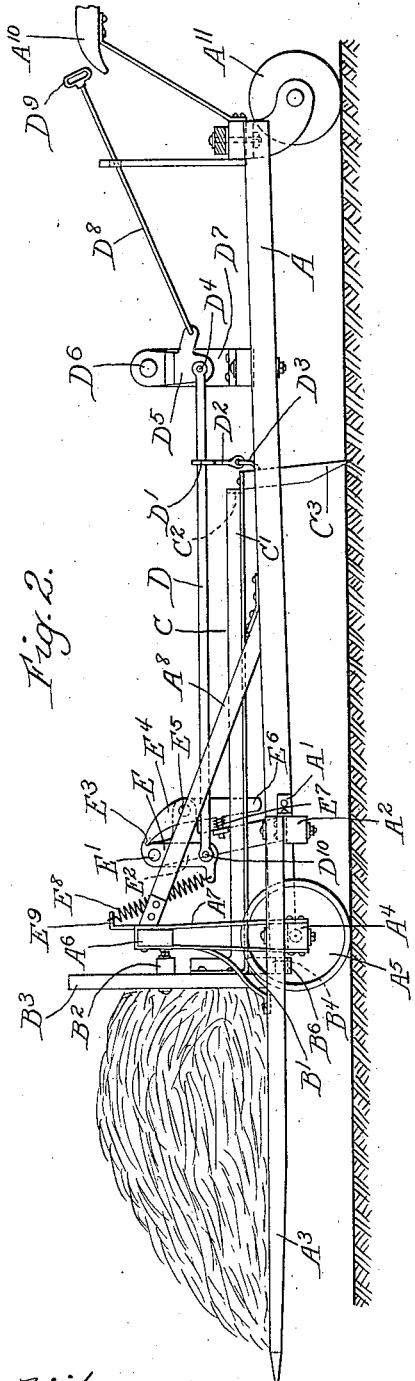
Figure 2 is a side elevation of the hay sweep with the sweep cleaner pushed to the rear.
Figure 3:
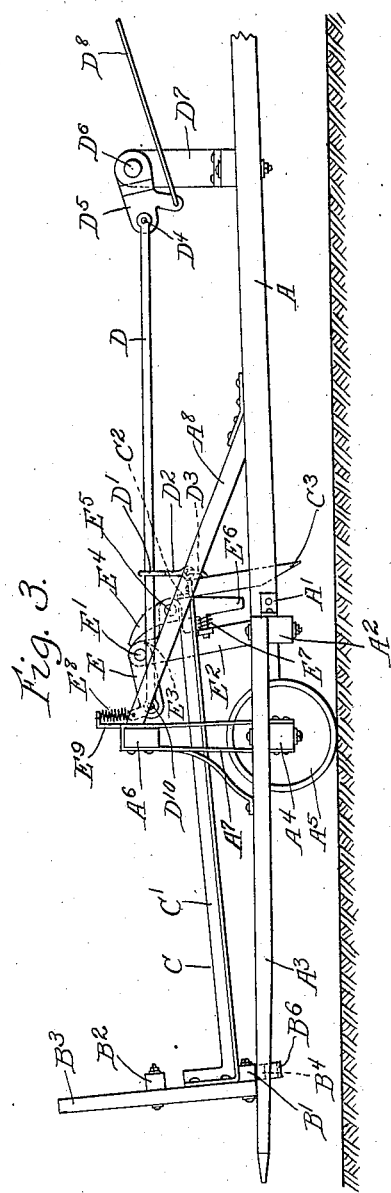
Figure 4:
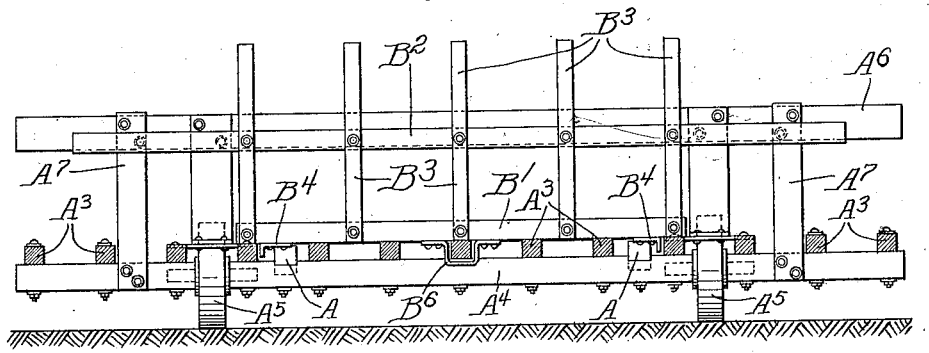
Figure 5:
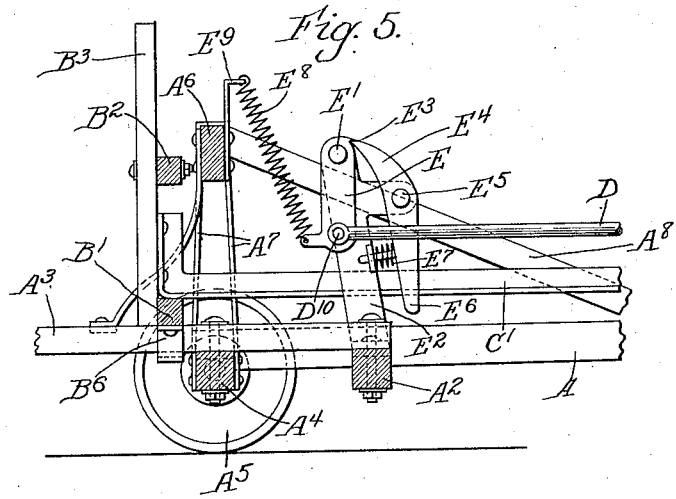
Figure 6:
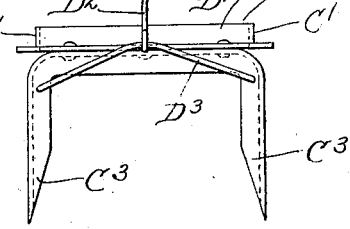

Figure 3 is a side elevation of the hay sweep, with the cleaner pushed forward;

Figure 4 is a section on the line 4—4 of Figure 1;

Figure 5 is a section on the line 5—5 of Figure 1;

Figure 6 is a section on the line 6—6 of Figure 1.

Like parts are indicated by like symbols throughout.

A A are shafts forming the body or frame of the hay sweep. Secured to them at $A'$ $A'$ is the member $A^2$ to which the tines $A^3$ $A^3$ of the fork are secured. The tines are further secured to a transversal member $A^4$, parallel with $A^2$, which supports them, and is in turn supported by the wheels $A^5$ $A^5$ for which it forms the axle. At the rear of the hay sweep fork is a rack formed by the member $A^6$, parallel to and normally above $A^2$, and joined to it by vertical supports $A^7$. To the top of $A^6$, preferably at a point where it is braced by the vertical support, are secured tension members $A^8$, which are secured to the hay sweep frame. Adjacent is a seat $A^{10}$ for the operator, and beneath it the supporting wheel $A^{11}$. The structure of the hay sweep can in all parts be greatly varied, without interfering with the application of my hay sweep cleaner, and it will be understood that the structure of the hay sweep does not form part of this invention. Mounted to ride, on, and axially movable along the tines is a rack consisting of parallel members $B'$ and $B^2$. The former, adapted to engage the tines of the fork, and transversely disposed thereto. Joining them are vertical member $B^3$, which serve to hold them in constant relation, and also act as a hay engaging lattice, when the cleaner is pushed along the fork. Their upper ends may, if desired, project well above these two. On the lower side of $B'$ are brackets or flanges $B^4$, preferably two in number, though more might be used. When two are used, they are positioned to contact the sides of two of the tines, the relation between the two tines and the brackets being similar to that of wheel flange and track in normal railroad practice. The member $B'$ may be provided if desired with an enclosing bracket $B^6$ adapted to surround one of the tines and thus prevent vertical as well as horizontal movement of the sweep cleaner. Both lateral and vertical motion of the cleaner are thus eliminated. It will be obvious that the form of the cleaner may be varied widely to conform to any type of fork or sweep with which it is used. Attached to the cleaning member is the yoke C comprising a plurality of shafts $C'$ joined at their outer end by the transversal member $C^2$. Secured to the rear of this yoke, and adjacent the transversal member are the depending prongs $C^3$ $C^3$ so inclined as to resist rearward motion in relation to the hay sweep. D is a substantially horizontal shaft or rod on which rides a pulley or eye $D'$ to which is secured a chain or supporting member $D^2$ adapted to support the transversal member $C^2$, by means of a bar $D^3$ attached thereto, or to the depending prongs. The rearward end of the shaft D is secured as at $D^4$ to the link $D^5$ pivoted at $D^6$ on the bracket $D^7$ upwardly projecting from the hay sweep frame. The pivoted link is controlled by a draw rod $D^8$ having a hand hole $D^9$ adjacent the seat $A^{10}$. The opposite end of the shaft or bar D is pivoted as at $D^{10}$ to the link E which is pivoted as at $E'$ to the bracket $E^2$ supported on the hay sweep frame. $E^3$ is a latch projection at the upper end of the link E adapted to be engaged by the dog $E^4$ which is pivoted as at $E^5$ on the bracket $E^2$ and has a trigger end $E^6$. The spring $E^7$, between the trigger $E^6$ and the bracket $E^2$ normally keeps the dog $E^4$ in contact with the latch $E^3$. The spring $E^8$ connects the end of the bar D, or the link E with the member $A^6$ or the projection $E^9$ therefrom, and normally tends to raise the bar D when the latch $E^3$ is sprung by rotation of the trigger $E^6$ in opposition to the spring $E^7$. Since the bar D is supported on two pivoted links of substantially equal length the entire bar is lifted by the action of the spring.

While I have illustrated a working apparatus, it will be obvious that the number, size and relation of the parts may be widely changed without departing from the spirit of my invention and I wish my description and drawings to be taken as in a large sense diagrammatic.

The use and operation of my invention are as follows:

My hay sweep cleaner is used with any of the hay sweeps now in use, and only minor variations of detail in construction are required to adapt it to the various types. It will be understood that my invention is limited to the hay sweep cleaner itself, and its co-operation with the sweep.

The rack of the hay sweep cleaner rides on the tines of the fork, and its rearwardly projecting frame lies between the shafts of the sweep. When the sweep is being moved forward to gather the hay the rod D is normally in a raised condition and the prongs of the hay sweep cleaner are out of contact with the ground. As the sweep is forced into the stack, the hay pushes the cleaner back towards the rear of the fork if it is not already in that position and the sweep is loaded with hay. When it is desired to clean the hay sweep and deposit the hay, the operator pulls on the rod or chain $D^8$ and thus depresses the lever the rod D and the catch member. The latch is then sprung dropping the rod to depressed position and thus enabling the prongs to contact the ground. If the forward motion of the sweep is continued the prongs, being rearwardly inclined simply glide along the ground. When the rearward motion of the sweep begins, however, the prongs bite into the ground and hold the cleaner stationary. The hay is thus kept stationary with the cleaner and the hay sweep fork is drawn out from under the hay. When the prongs are cleared, the rearward portion of the yoke contacts the trigger, releases the catch, and permits the rod D to be drawn upwards by the spring, jerking the prongs out of contact with the ground.

With this type of ground engaging member, the sweep may be easily cleaned in response to a pull by the operator, with the advantage that the ground engaging prongs are normally suspended free from the ground and thus do not interfere either with the forward progress of the sweep or with the turning about of the sweep in the course of collecting or conveying the hay.

I claim:

1. In a hay sweep cleaner a rack adapted to ride on the tines of a hay sweep, a rearward extension therefrom, ground contacting elements secured thereto, a support adapted normally to hold said elements out of contact with the ground, a horizontal member along which said support rides in a path parallel with the normal path of travel of the sweep, yielding means for keeping said member normally in a raised position, means in opposition to said yielding means for depressing said support, and means for keeping it in a depressed position during a predetermined rearward travel of the hay sweep.

2. In a hay sweep cleaner a rack adapted to ride on the tines of a hay sweep, a rearward extension therefrom, ground contacting elements secured thereto, a support adapted normally to hold said elements out of contact with the ground, a horizontal member along which said support rides in a path parallel with the normal path of travel of the sweep, yielding means for keeping said member normally in a raised position, means in opposition to said yielding means for depressing said support, and means for keeping it in a depressed position during a predetermined rearward travel of the hay sweep, a means automatically responsive to a predetermined rearward movement of the sweep for releasing said yielding means and raising said member.

3. In a hay sweep cleaner a rack adapted to ride on the tines of a hay sweep a rearward extension for said rack, ground contacting elements secured to said extension, a support adapted normally to hold said elements out of contact with the ground, a longitudinal bar on which said support rides, yielding means adapted normally to hold said bar and said ground contacting means in raised position, means in opposition to said yielding means for depressing said bar and a latch element adapted to hold said bar in depressed position.

4. In a hay sweep cleaner a rack adapted to ride on the tines of a hay sweep a rearward extension for said rack, ground contacting elements secured to said extension, a support adapted normally to hold said elements out of contact with the ground, a longitudinal bar on which said support rides, yielding means adapted normally to hold said bar and said ground contacting means in raised position, means in opposition to said yielding means for depressing said bar and a latch element adapted to hold said bar in depressed position, and a trigger adapted to release said bar to the raised position, in response to a predetermined rearward movement of the hay sweep in relation to the ground contacting elements.

5. In a hay sweep cleaner a rack adapted to ride on the tines of a hay sweep, a rearward extension for said rack, ground contacting elements secured to said extension, a support adapted normally to hold said elements out of contact with the ground, a longitudinal member on which said support rides, yielding means for keeping said longitudinal member normally in a raised position comprising a link on which said bar can be supported and yielding means for rotating said link to raise said bar, means in opposition to said yielding means for depressing said support, and means for keeping it in a depressed position during a predetermined rearward travel of the hay sweep, comprising a latch element on said link and a dog adapted to engage it when said bar is brought into depressed position.

6. In a hay sweep cleaner a rack adapted to ride on the tines of a hay sweep, a rearward extension for said rack ground contacting elements secured to said extension, a support adapted normally to hold said elements out of contact with the ground, a longitudinal member on which said support rides, yielding means for keeping said longitudinal member normally in a raised position comprising a link on which said bar can be supported and yielding means for rotating said link to raise said bar, means in opposition to said yielding means for depressing said support, and means for keeping it in a depressed position during a predetermined rearward travel of the hay sweep, comprising a latch element on said link and a dog adapted to engage it when said bar is brought into depressed position and a trigger adapted to release said dog after a predetermined rearward movement of the hay sweep cleaner.

7. In a hay sweep cleaner a rack adapted to ride on the tines of a hay sweep, a rearward extension for said rack, ground contacting elements secured to said extension, a support adapted normally to hold said elements out of contact with the ground, a longitudinal member on which said support rides, yielding means for keeping said longitudinal member normally in a raised position comprising a link on which said bar can be supported and yielding means for rotating said link to raise said bar, means in opposition to said yielding means for depressing said support, and means for keeping it in a depressed position during a predetermined rearward travel of the hay sweep, comprising a latch element on said link and a dog adapted to engage it when said bar is brought into depressed position and a trigger adapted to be contacted by the rearward extension of the hay sweep cleaner, after a predetermined rearward movement of the hay sweep to release said dog.

Signed at Fort Collins, county of Larimer and State of Colorado, this 11th day of July, 1921.

LOUIS J. JENSON.